(12) United States Patent
Fink

(10) Patent No.: US 9,676,319 B2
(45) Date of Patent: Jun. 13, 2017

(54) BED RAIL EXTENDER CLIP

(71) Applicant: ADVANTAGE TRUCK ACCESSORIES, INC., Ann Arbor, MI (US)

(72) Inventor: Jeffrey A. Fink, Bristol, IN (US)

(73) Assignee: Advantage Truck Accessories, Inc., Ann Arbor, MI (US)

( * ) Notice: Subject to any disclaimer, the term of this patent is extended or adjusted under 35 U.S.C. 154(b) by 0 days.

(21) Appl. No.: 14/807,026

(22) Filed: Jul. 23, 2015

(65) Prior Publication Data
US 2015/0321543 A1   Nov. 12, 2015

Related U.S. Application Data

(62) Division of application No. 13/930,476, filed on Jun. 28, 2013, now Pat. No. 9,120,413.

(51) Int. Cl.
*B60P 7/04* (2006.01)
*B60P 7/02* (2006.01)
*B60J 7/10* (2006.01)

(52) U.S. Cl.
CPC ............ *B60P 7/02* (2013.01); *B60J 7/102* (2013.01); *B60J 7/104* (2013.01)

(58) Field of Classification Search
CPC .................................. B60P 7/02; B60P 7/04
USPC ............................. 296/100.17, 100.18
See application file for complete search history.

(56) References Cited

U.S. PATENT DOCUMENTS

| | | | | |
|---|---|---|---|---|
| 4,547,014 A | * | 10/1985 | Wicker | B60J 7/065 160/84.06 |
| 4,730,866 A | * | 3/1988 | Nett | B60J 7/104 296/100.18 |
| 5,261,719 A | * | 11/1993 | Tucker | B60J 7/104 224/405 |
| 5,655,808 A | | 8/1997 | Wheatley | |
| 5,788,315 A | * | 8/1998 | Tucker | B60J 7/102 160/395 |
| 5,873,688 A | * | 2/1999 | Wheatley | B60P 7/0815 410/101 |
| 5,921,603 A | | 7/1999 | Karrer | |
| 5,975,618 A | * | 11/1999 | Rippberger | B60J 7/104 248/316.6 |
| 6,024,401 A | * | 2/2000 | Wheatley | B60J 7/102 296/100.17 |
| 6,053,558 A | | 4/2000 | Weldy et al. | |

(Continued)

*Primary Examiner* — H Gutman
(74) *Attorney, Agent, or Firm* — Harness, Dickey & Pierce, PLC

(57) ABSTRACT

A tonneau cover system is provided for a cargo box of a pickup truck. The cargo box including a sidewall having an inboard side, wherein the inboard side extends downward and includes a lower edge. The tonneau cover system comprises a framework assembly positionable over the cargo box of the pickup truck and a bed rail extender having an engagement surface. The bed rail extender is adapted to attach to the inboard side such that the engagement surface is spaced downward from the lower edge of the inboard side. A clamp assembly is operably coupled to the framework system. The clamp assembly has an engaging member selectively positioned between a latched position and an unlatched position. The engaging member is adapted to contact the engagement surface of the bed rail extender in the latched position to retain the framework assembly to the cargo box.

18 Claims, 10 Drawing Sheets

(56) References Cited

U.S. PATENT DOCUMENTS

| | | | |
|---|---|---|---|
| 6,059,159 A * | 5/2000 | Fisher | B60R 9/00 224/309 |
| 6,234,561 B1 | 5/2001 | Huotari | |
| 6,322,129 B2 | 11/2001 | Huotari | |
| 6,543,836 B1 | 4/2003 | Wheatley | |
| 6,669,264 B1 | 12/2003 | Tucker | |
| 6,948,761 B2 | 9/2005 | Haack et al. | |
| 7,188,888 B2 | 3/2007 | Wheatley et al. | |
| 7,530,614 B2 | 5/2009 | Nichols | |
| 8,157,229 B2 * | 4/2012 | Palermo | B60P 7/0815 224/403 |
| 2007/0210609 A1 * | 9/2007 | Maimin | B60P 7/02 296/100.09 |
| 2008/0179911 A1 | 7/2008 | Spencer et al. | |
| 2008/0203756 A1 * | 8/2008 | Lake | B60P 7/02 296/100.08 |
| 2010/0038926 A1 * | 2/2010 | Williamson | B60J 7/104 296/100.16 |
| 2013/0341956 A1 | 12/2013 | Garska | |
| 2015/0061315 A1 * | 3/2015 | Facchinello | B60P 7/02 296/100.07 |

* cited by examiner

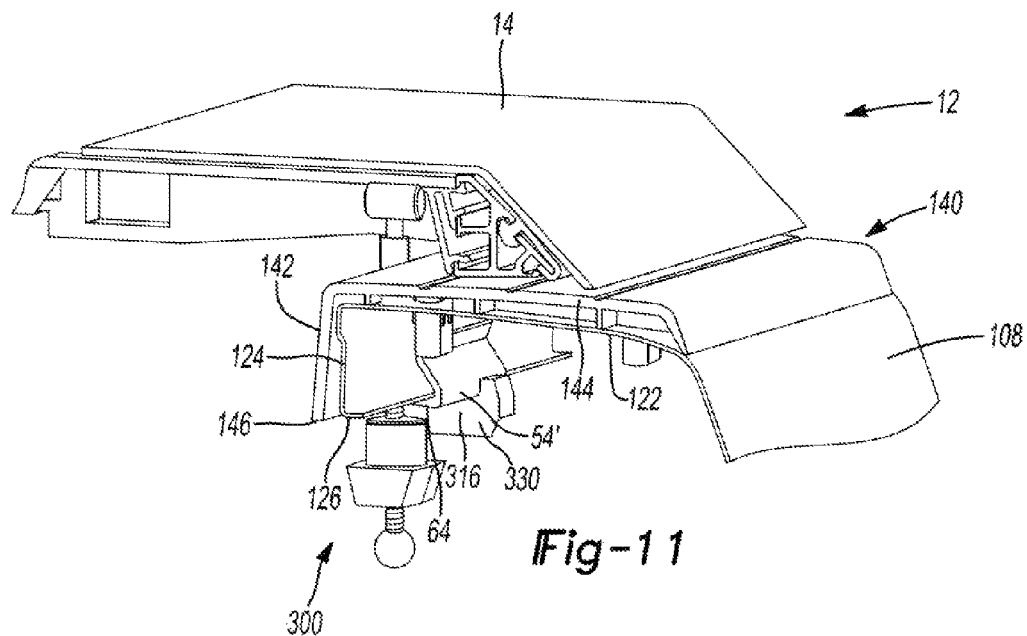
Fig-11
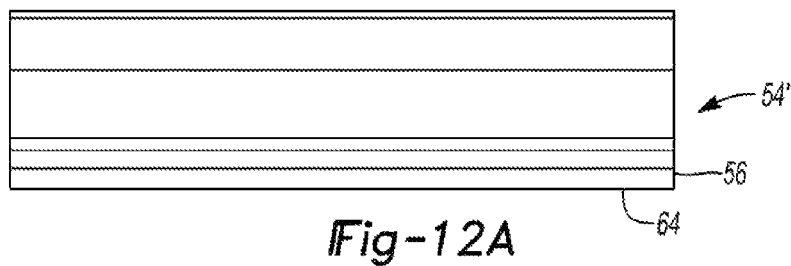
Fig-12A
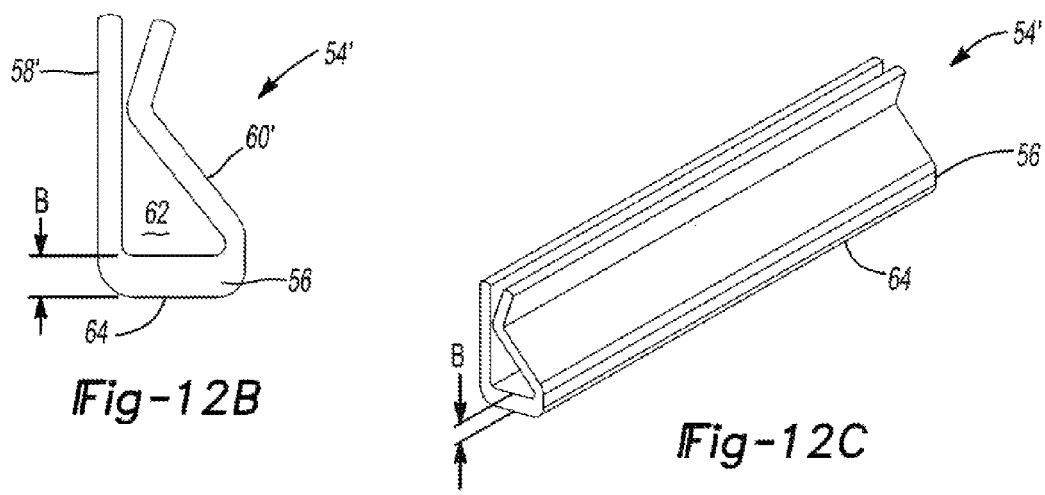
Fig-12B
Fig-12C

BED RAIL EXTENDER CLIP

CROSS-REFERENCE TO RELATED APPLICATIONS

This application is a divisional of U.S. patent application Ser. No. 13/930,476, filed on Jun. 28, 2013. The entire disclosure of the above application is incorporated herein by reference.

FIELD

The present disclosure relates to coverings for pickup trucks and, more particularly, relates to a bed rail extender clip for mounting the tonneau cover system to the flange of the bed of the pickup truck without damage to an installed bed cap device.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching system for coupling the frame network to the pickup truck and a means for stowing the latching system, and a hinge system for hingedly coupled adjacent sections of the foldable tonneau cover. However, the known prior art fails to maximize the ease and effectiveness of foldable tonneau covers and, thus, many foldable tonneau covers suffer from numerous disadvantages.

By way of example, existing latching systems generally employ an over center cam lock arrangement, wing nut clamp arrangement, and/or spring biased clamp arrangement to fasten the tonneau cover in place relative to the pickup truck. The latching system typically hooks onto the downwardly projecting (metal) flange of the truck bed. This latching system, in the case of the cam lock arrangement, is adjustable by rotating a threaded cam pivot to permit attachment of the latching system to pickup trucks with differing length downwardly projecting flanges. The other latching systems can used threaded portions or other telescoping type mechanisms to provide a length adjustment feature.

However, these latching systems lead to various problems or failures when used with more recent pickup truck bed designs produced by original equipment manufacturers (OEM). For instance, many of the newer pickup trucks now come with a bed cap that is installed by the OEM over the top, planar surface of the sidewalls of the pickup truck bed. That is, in some embodiments, the bed cap is made of a plastic or lightweight metal material and positioned over the top metal surface of the pickup truck sidewalls (collectively including the front wall, the sidewalls, and the tailgate). The bed caps can provide an aesthetic finish to the pickup truck bed and/or provide a degree of protection for the sidewalls from scratches and light abrasions. As mentioned, the bed caps are often made of a plastic or lightweight metal material and are often fastened to the metal sidewall flanges of the pickup truck using lightweight fastening systems, such as small fasteners or adhesives. As such, these bed caps are not intended to support any substantial load, particularly in the upward direction.

Unfortunately, many of these bed caps are sized to wrap around the top planar surface of the metal sidewall flanges of the pickup truck and extend downwardly past the inboard edge of the metal sidewall flange. This provides a neat aesthetic finish to the metal sidewall flange, but also results in the plastic or lightweight metal bed cap becoming the lowermost portion of the sidewall flange. In typical tonneau cover installations, the aforementioned latching systems connect directly to this lowermost portion of the sidewall flange. Without a bed cap, the latching system connects with the rigid and robust metal sidewall flange of the pickup bed sidewall, which is capable of withstanding the loading forces produced by these latching systems and those dynamic forces associated with vehicle operation, such as vibration, aerodynamic, and the like. However, with a bed cap, the latching system connects with the plastic or lightweight metal bed cap, thereby causing the bed cap to, at a minimum, deflect and potentially lead to distortion, breakage, and other damage.

Accordingly, there exists a need in the relevant art to permit these existing latching systems to be mounted to pickup truck sidewalls having bed caps without transferring their loading forces to the bed caps themselves.

Moreover, in some embodiments, it has also been found that in response to various dynamic forces during operation of the vehicle, the position of the tonneau system can vary or shift relative to the pickup truck bed. Conventional tonneau systems are typically held in position relative to the pickup truck bed by the frictional force produced when the latching system of the tonneau cover system is coupled with the pickup truck sidewalls.

Accordingly, there exists a need in the relevant art to provide a tonneau cover system capable of overcoming the disadvantages of the prior art. Additionally, there exists a need in the relevant art to provide a tonneau cover system that is capable of being retained in a fore, aft, and/or lateral position in response to dynamic forces using a rail retention system.

SUMMARY

This section provides a general summary of the disclosure, and is not a comprehensive disclosure of its full scope or all of its features.

According to the principles of the present teachings, a tonneau cover system is provided for a cargo box of a pickup truck. The cargo box including a sidewall having an inboard side, wherein the inboard side extends downward and includes a lower edge. The tonneau cover system comprises a framework assembly positionable over the cargo box of the pickup truck and a bed rail extender having an engagement surface. The bed rail extender is adapted to attach to the inboard side such that the engagement surface is spaced downward from the lower edge of the inboard side. A clamp assembly is operably coupled to the framework system. The clamp assembly has an engaging member selectively positioned between a latched position and an unlatched position. The engaging member is adapted to contact the engagement surface of the bed rail extender in the latched position to retain the framework assembly to the cargo box.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 11 is a perspective view illustrating the clamp assembly and bed rail extender clip member according to some embodiments;

FIG. 12A is a front view of the bed rail extender clip member of FIG. 11 according to some embodiments;

FIG. 12B is an end view of the bed rail extender clip member of FIG. 11 according to some embodiments;

FIG. 12C is a perspective view of the bed rail extender clip member of FIG. 11 according to some embodiments;

Figure 15:
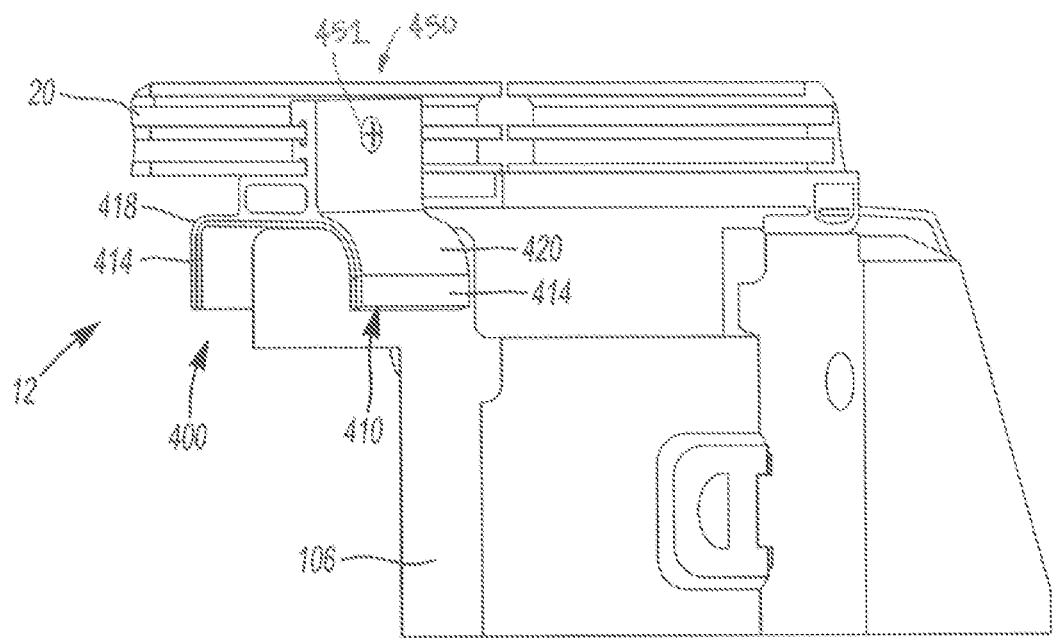
Figure 16:
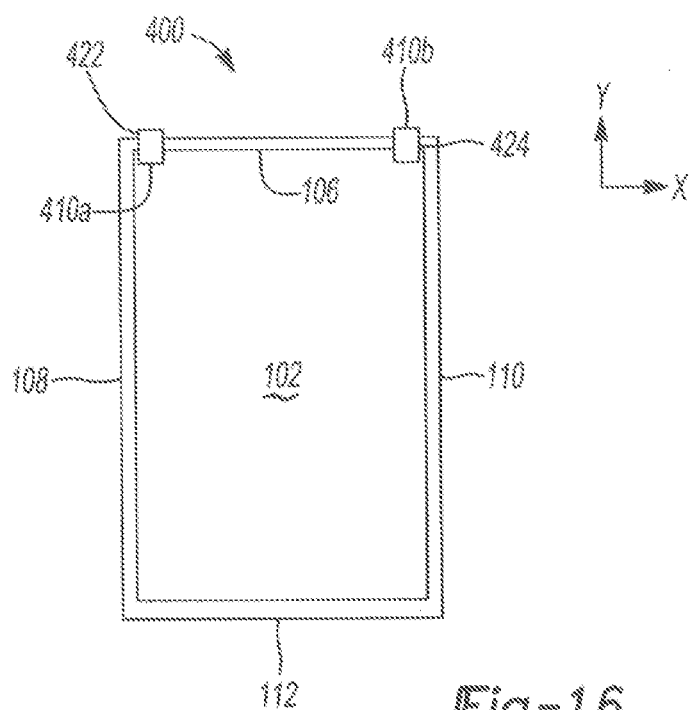

FIG. 15 is a perspective view of the tonneau cover positioning system mounted on a front wall of the cargo box of the pickup truck according to some embodiments; and FIG. 16 is a schematic plan view illustrating the tonneau cover positioning system mounted on a front wall of the cargo box of the pickup truck having two or more positioner mounts to prevent or at least inhibit cross vehicle movement.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a pickup truck 100 is shown having a foldable tonneau system 12 for use with pickup truck 100. Pickup truck 100 generally includes a cargo box 102 and a passenger cabin 104. Cargo box 102 includes a front wall 106 (FIG. 16), a left sidewall 108, a right sidewall 110, and a rear wall or tailgate 112. It should be understood that right sidewall 110 and left sidewall 108 of pickup truck 100 are identical, yet arranged in mirrored symmetry. Accordingly, in the interest of brevity, only one side will be discussed in detail below in connection with foldable tonneau system 12 unless noted otherwise Still referring to FIGS. 1-4, foldable tonneau system 12 includes, in some embodiments, a flexible, stretchable fabric cover 14 (or other suitable cover material being soft or hard) that is drawn tightly over a plurality of tonneau sections 16a-16n. It should be understood that the principles of the present invention are equally applicable to foldable tonneau systems having two, three, or more sections, each foldable relative to adjacent sections. However, for purposes of this disclosure, a foldable tonneau system having three tonneau sections 16a, 16b, and 16n will be described. This configuration should not be regarded as limiting the claims herein. Tonneau sections 16a-16n may be referred to herein as front tonneau section 16a, middle tonneau section 16b, and rear tonneau section 16n.

Each of the plurality of tonneau sections 16a-16n includes an internal framework of support members that are attached to one another to form a rectangular frame. Specifically, front tonneau section 16a includes a front rail member 20 fixedly coupled to a pair of side members 22 via a corner insert 24. Corner insert 24 is preferably rounded along an exterior surface to prevent stress concentrations in fabric cover 14. Corner insert 24 includes a pair of male portions (not shown) sized to be fixedly received and engaged within front rail member 20 and the pair of side members 22. A corner brace 26 is fixedly coupled, via conventional threaded fasteners, between front rail member 20 and each side member 22 to provide improved structural integrity. Front tonneau section 16a further includes one or more cross bow members 28 being generally parallel to front rail member 20 and spaced apart therefrom (in some embodiments, other tonneau sections can also include cross bow members, such as cross bow members 46 of tonneau section 16b coupled to side members 44 via corner brace 48). In some embodiments, cross bow member 28 is generally C-shaped in cross section and is fixedly coupled to the pair of side members 22 via a corner brace 30 disposed on opposing ends thereof. It should be understood that additional or alternative connection features may be employed to couple cross bow member 28 to the pair of side members 22. Moreover, it should be understood that cross bow members 28, 40, and 46 can be made of any suitable material and define any suitable cross-sectional size and shape. The pair of side members 22 is adapted to rest upon a top surface of sidewalls 108 and 110.

Similarly, rear tonneau section 16n includes a rear rail member 32 fixedly coupled to a pair of side members 34 via a corner insert 36. Corner insert 36 is preferably rounded along an exterior surface to prevent stress concentrations in fabric cover 14. Corner insert 36 includes a pair of male portions (not shown) sized to be fixedly received and engaged within rear rail member 32 and the pair of side members 34. A corner brace 38 is fixedly coupled, via conventional threaded fasteners, between rear rail member 32 and each side member 34 to provide improved structural integrity. Rear tonneau section 16n further includes a cross bow member 40 being generally parallel to rear rail member 32 and spaced apart therefrom. For manufacturing simplicity, cross bow member 40 can be identical to cross bow member 28 in cross section and side members 34 can be similar to, but vary in length relative to, side member 22. However, it should be appreciated that this is not required.

Cross bow member 40 is fixedly coupled to the pair of side members 34 via a corner brace 42 disposed on opposing ends thereof. Again, it should be understood that additional or alternative connection features may be employed to couple cross bow member 40 to the pair of side members 34. The pair of side members 34 is adapted to rest upon a top surface of sidewalls 108 and 110.

For additional detail relating to the construction of tonneau sections 16a, 16b, and 16n, and their association interconnection, attention should be directed to commonly-assigned U.S. Pat. No. 7,188,888, which is incorporated herein by reference.

Locking Spring Clamp Assembly

Turning now to FIGS. 5-12, tonneau sections 16a, 16b, and/or 16n can be fixedly coupled to sidewall 108 of cargo box 110 via a latching system 300, such as a locking spring clamp assembly 300' (FIG. 5), a wing nut clamp assembly 300" (FIG. 6), a cam actuated clamp assembly 300''' (FIG. 7), or other latching system. By way of example, in some embodiments, latching system 300 can be fixedly coupled to any portion of foldable tonneau system 12 that provides sufficient structural integrity. In particular, in some embodiments, latching assembly 300 can be fixedly coupled to any one or more of cross bow members 28, 40, and 46. Moreover, in some embodiments, depending on the material used for cover 14, latching assembly 300 can be affixed to cover 14 directly or other structure along the underside of foldable tonneau system 12. Latching assembly 300 is configured to provide a releasable locking interconnection between tonneau sections 16a, 16b, and/or 16c and cargo box 110 of the pickup truck 100 to maintain foldable tonneau system 12 in a reliably, retained position relative to pickup truck 100.

As discussed herein, latching assembly 300 is configured to engage the cargo box 110 of the pickup truck 100 along sidewalls 108, 110. Latching assembly 300, in some embodiments, includes a biasing member capable of exerting a biasing force to retract latching assembly 300, thereby exerting an associated force on sidewalls 108, 110 to retain foldable tonneau system 12 in a retained position. Latching assembly 300 can further include an automatically-engageable locking system, such as a ratchet and toggle system that ensures that latching assembly 300 is automatically retained at an installed length, thereby preventing inadvertent loosening of the retention system (latching assembly 300).

With specific reference to FIGS. 5-8 and 11, in some embodiments, latching system 300 can comprise a latch feature or hook member 330 formed generally along a portion of a main body portion 316 for engaging sidewall 108. It should be appreciated that the exact location of latch feature 330 is dependent on the dimensions of the sidewall 108, the latching assembly 300 and the overall construction of tonneau system 12. However, in some embodiments as illustrated, hook member 330 can be formed along an exterior surface of main body portion 316. Hook member 330 can comprise a main portion 332 extending generally orthogonal from main body portion 316 terminating at an upturned portion 334. Main portion 332 and upturned portion 334 together define a channel therebetween that is sized and adapted to capture a flange or other feature (e.g. bed rail extender clip member) extending from sidewall 108 to retain latching assembly 300 to sidewall 108 of pickup truck 100 and provide a rigid connection therebetween.

Figure 1:
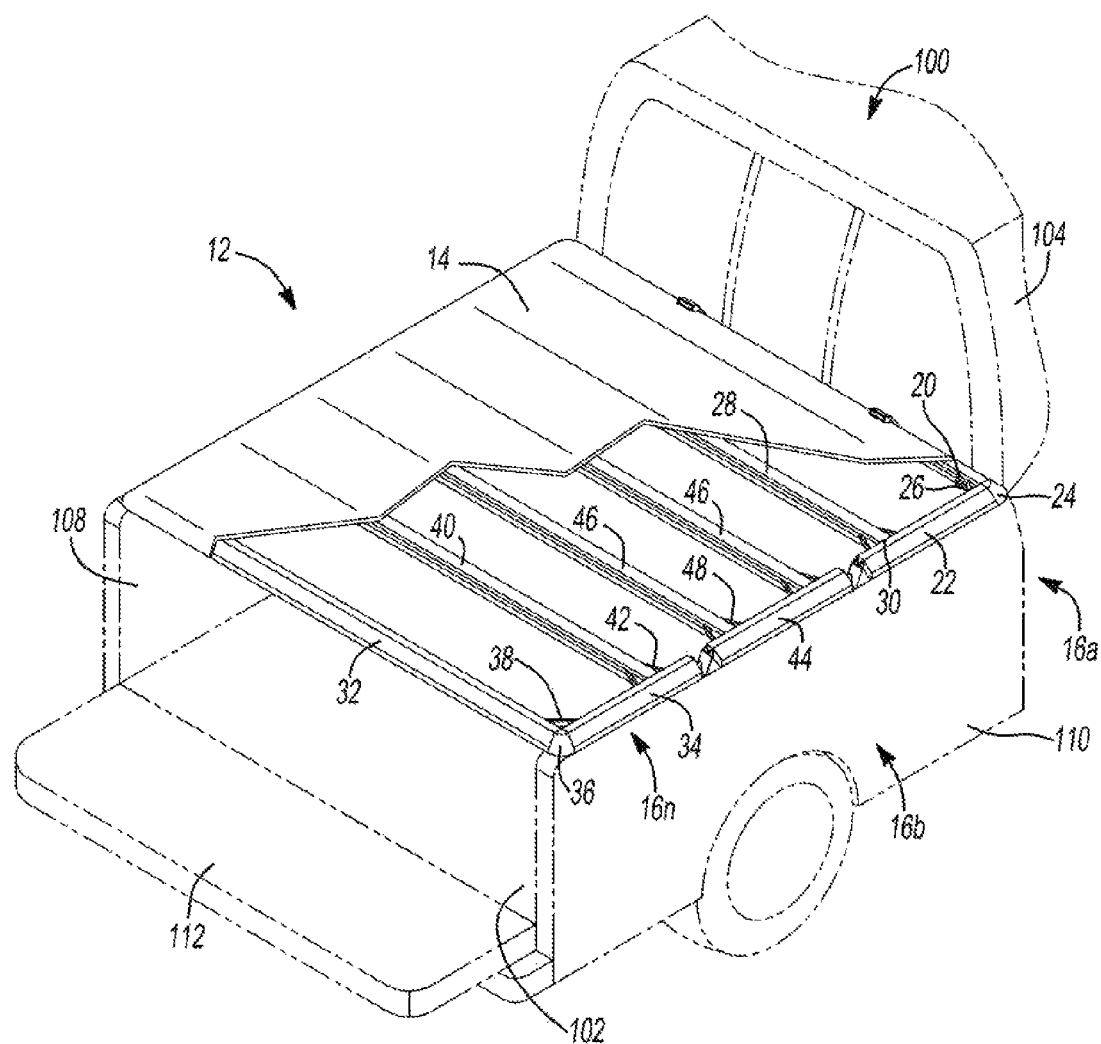
FIG. 1 is a perspective view illustrating a tonneau cover according to the principles of the present teachings positioned upon a cargo box of a pickup truck.
Figure 2:
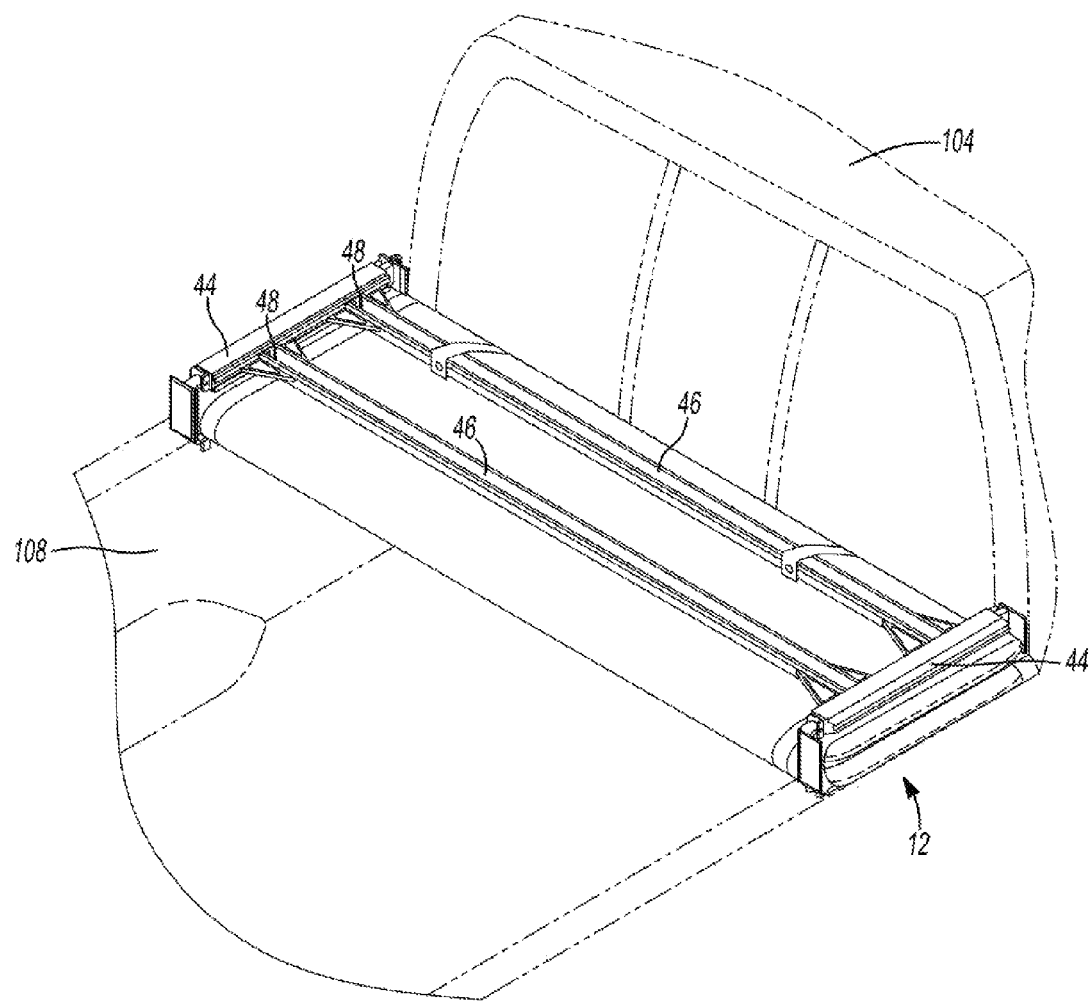
FIG. 2 is a perspective view illustrating the tonneau cover in a folded position.
Figure 3:
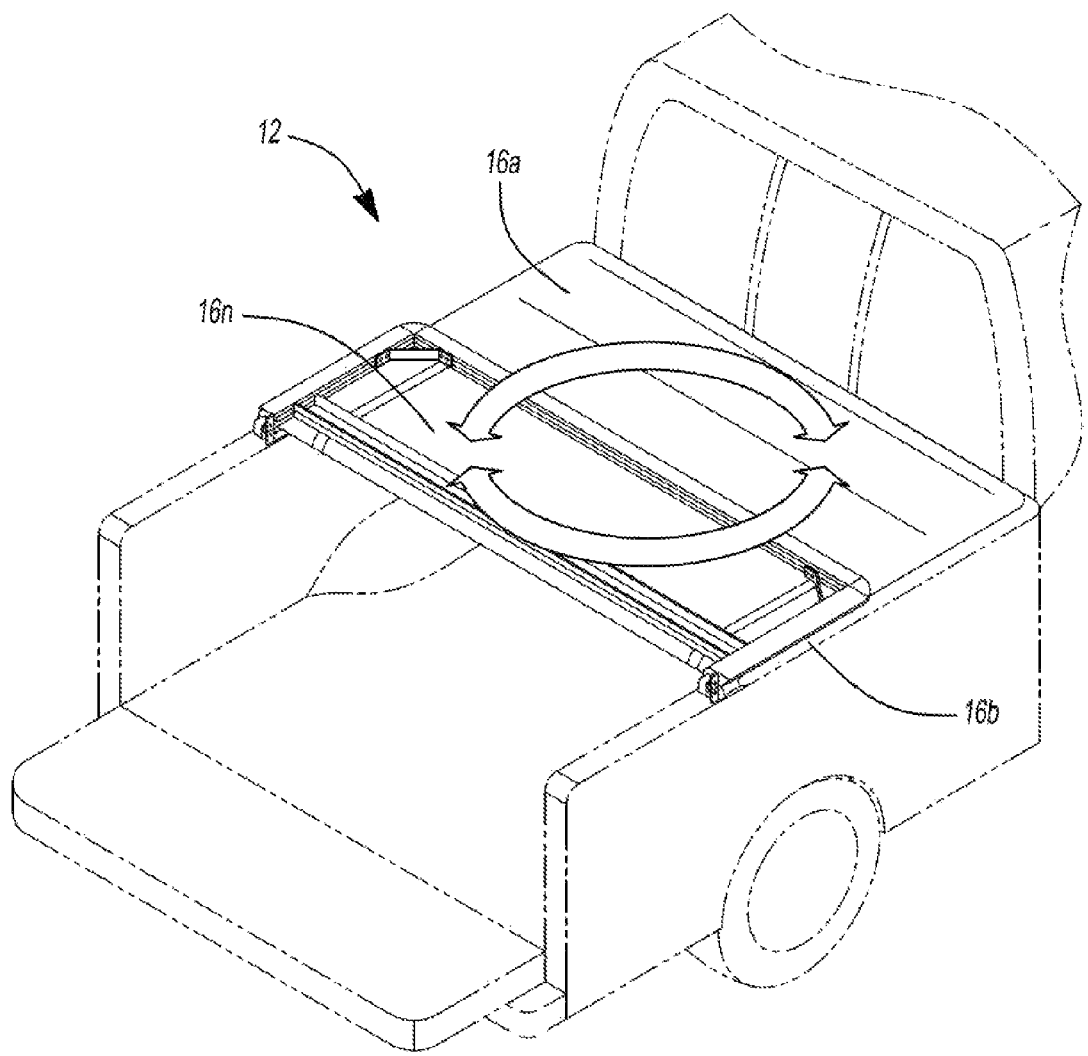
FIG. 3 is a perspective view illustrating the tonneau cover with a rear tonneau section folded upon a middle tonneau section.
Figure 4:
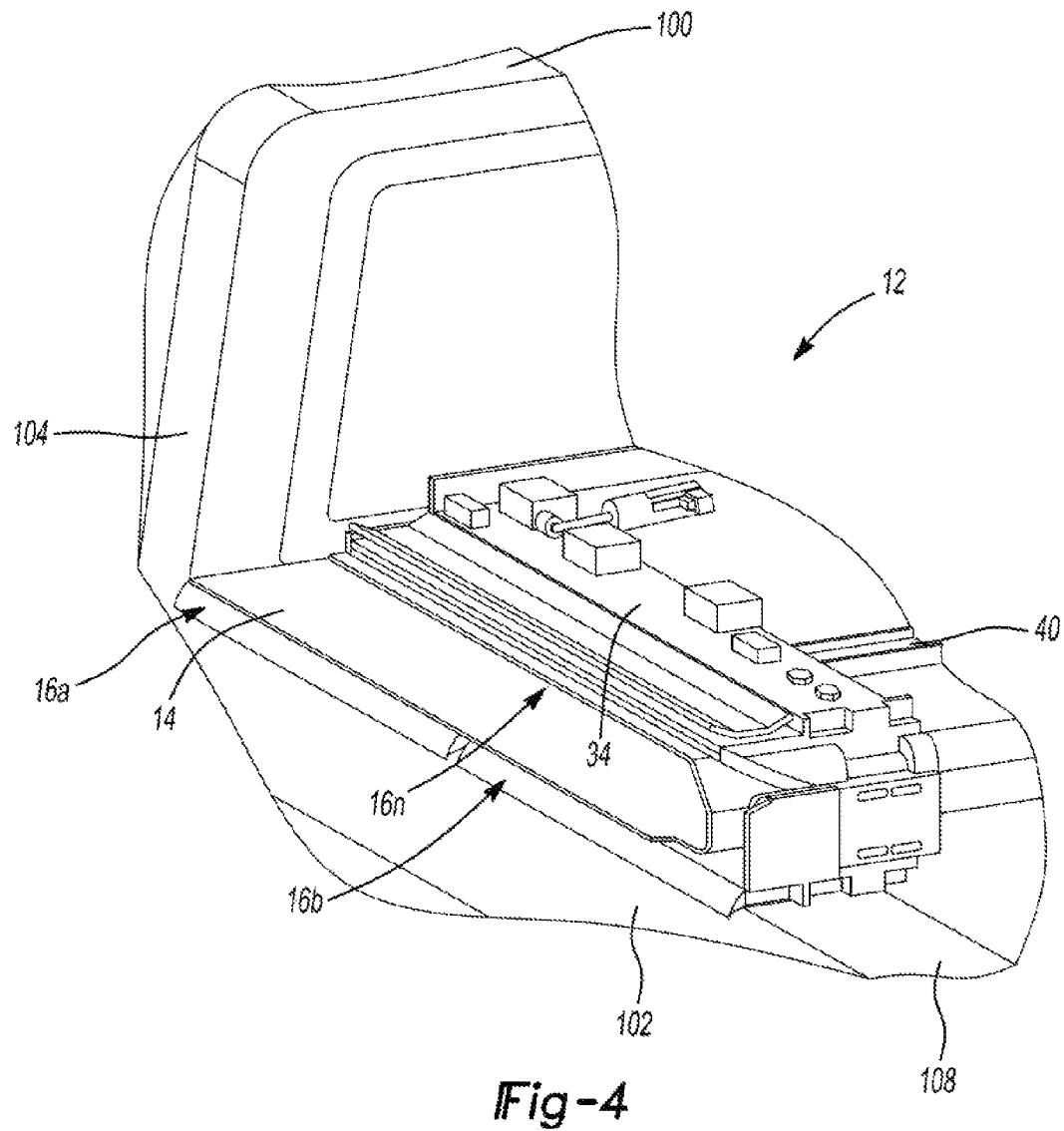
FIG. 4 is an enlarged perspective view illustrating the tonneau cover folded upon a middle tonneau section.
Figure 5:
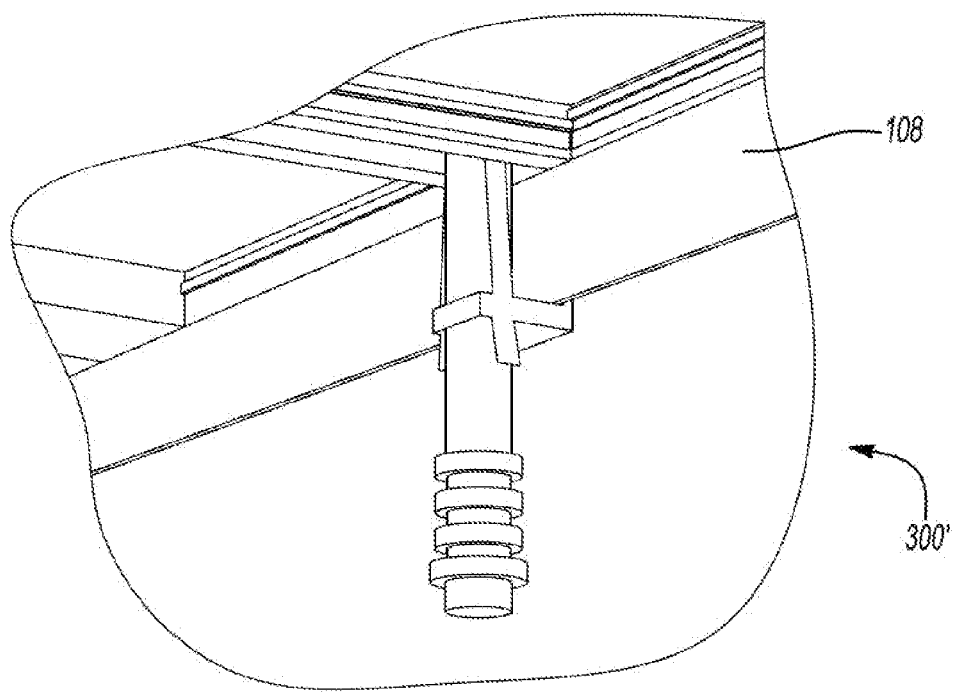
FIG. 5 is a perspective view illustrating a locking spring clamp assembly according to some embodiments.
Figure 6:
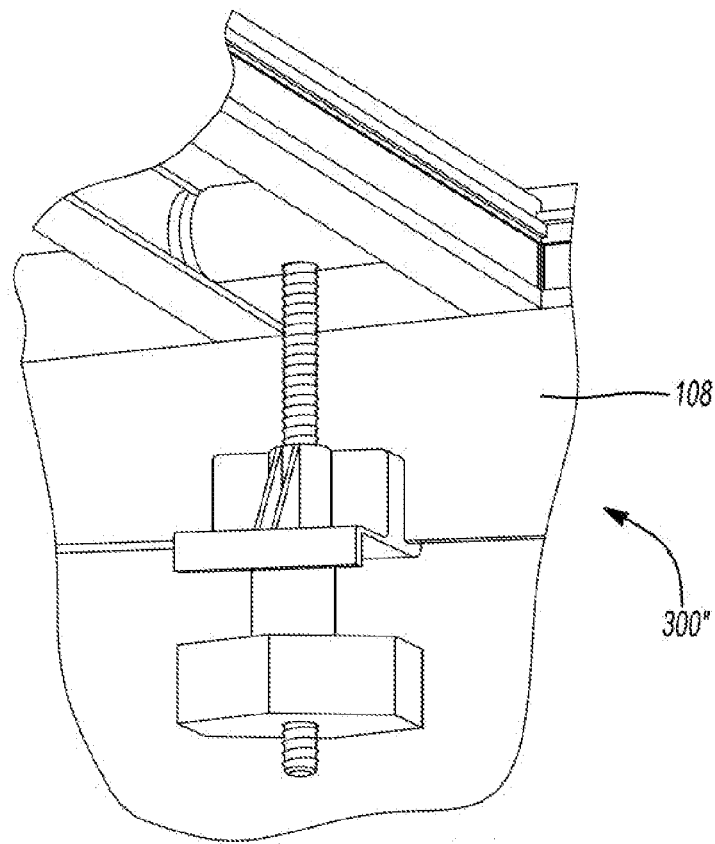
FIG. 6 is a perspective view illustrating a wing nut clamp assembly according to some embodiments.
Figure 7:
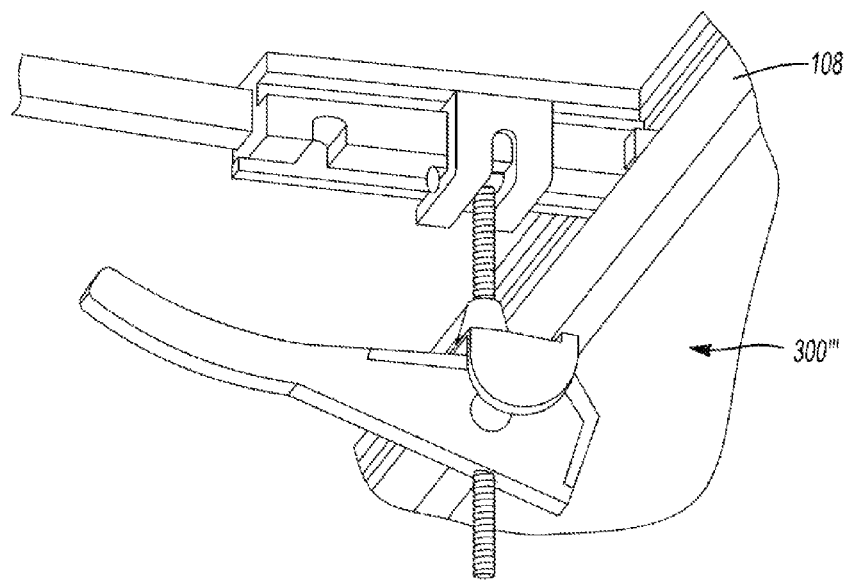
FIG. 7 is a perspective view illustrating a cam actuated clamp assembly according to some embodiments.
Figure 8:
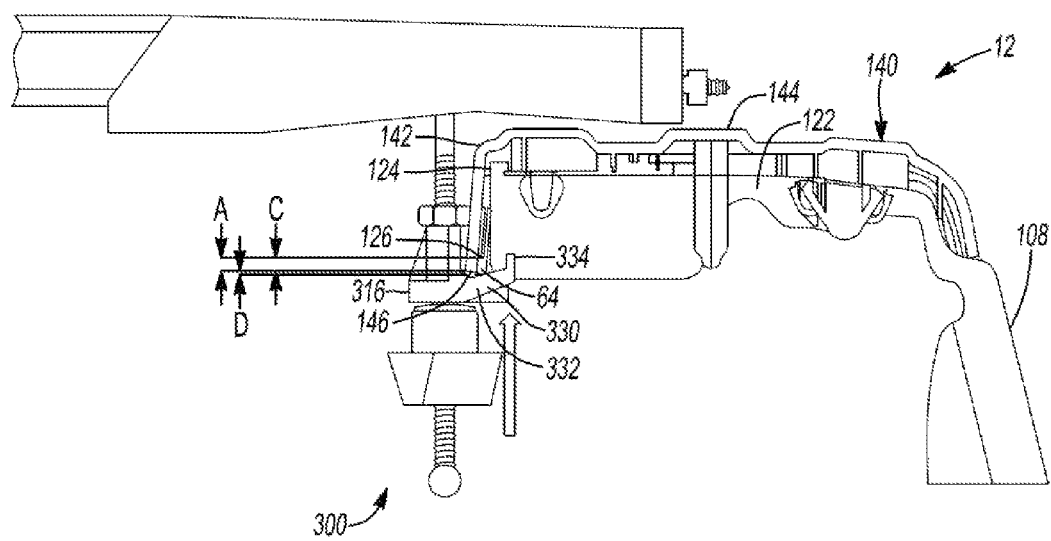
FIG. 8 is a partial cross-sectional view illustrating a clamp assembly and bed rail extender clip member according to some embodiments.
Figure 9:
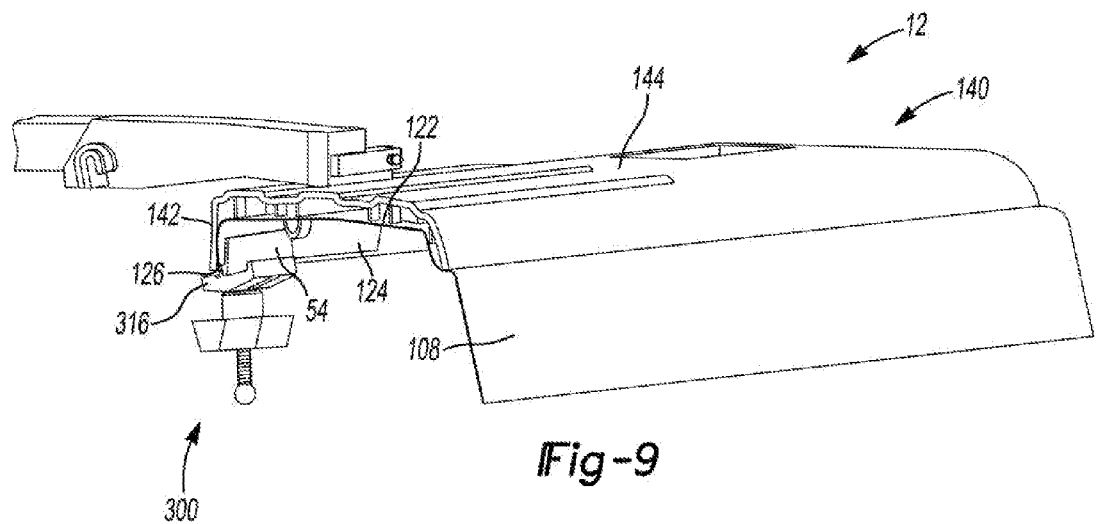
FIG. 9 is a perspective view illustrating the clamp assembly and bed rail extender clip member according to some embodiments.
Figure 10A:
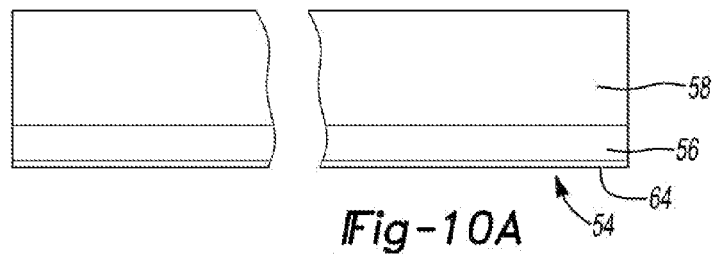
FIG. 10A is a front view of the bed rail extender clip member of FIG. 9 according to some embodiments.
Figure 10B:
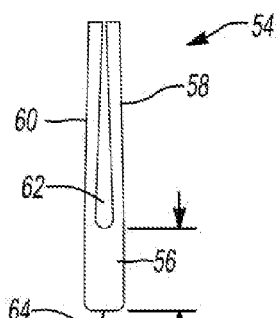
FIG. 10B is an end view of the bed rail extender clip member of FIG. 9 according to some embodiments.
Figure 10C:
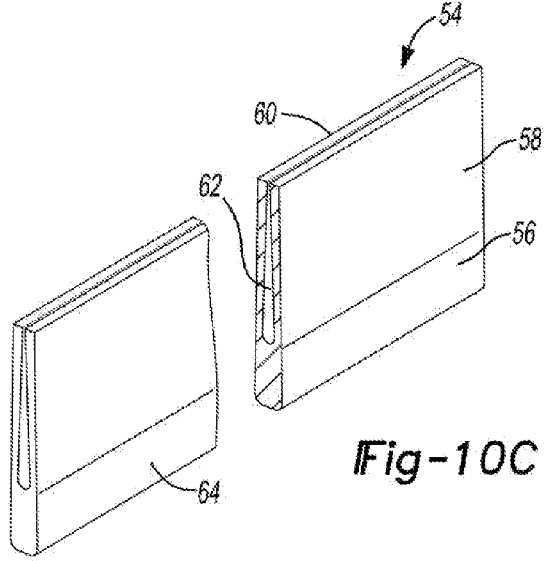
FIG. 10C is a perspective view of the bed rail extender clip member of FIG. 9 according to some embodiments.

With particular reference to FIG. 8, it can be seen that sidewall 108 (and the front wall 106) of pickup truck 100 can include an outboard side 120, a top side 122, and an inboard side 124 terminating at an inboard edge 126. In some embodiments, outboard side 120, top side 122, and inboard side 124 of sidewall 108 are formed of a continuous metal panel that is formed or otherwise permanently joined to define a rigid and robust member capable of containing contents disposed within the cargo box 102 of pickup truck 100. More particularly, top side 122 is similarly configured to support the top down weight of tonneau system 12 as tonneau system 12 is positioned on top and in contact with top side 122 of cargo box 102 (including the similarly configured top side surface of front wall 106 and tailgate 112).

In some embodiments, sidewall 108 of pickup truck 100 comprises a bed cap members 140 disposed along at least a portion of sidewall 108. It should be appreciated that bed cap member 140 can be mounted to any one or more of front wall 106, sidewalls 108, 110, and tailgate 112. In some embodiments, bed cap member 140 comprises a central body portion 144 generally covering at least a portion of top side 122 of sidewall 108. Bed cap member 140 is shaped to include at least an inboard leg 142 downwardly extending from central body portion 144. Inboard leg 142 can be shaped to closely conform to inboard side 124 of sidewall 108. In some embodiments, inboard leg 142 terminates at a distal edge 146 that is generally longer than inboard side 124 of sidewall 108 by a distance A (FIG. 8). In some embodiments, bed cap member 140 is coupled to sidewall 108, such as along top side 122, using one or more fastening systems. Conventional fastening systems, such as adhesive, small fasteners, and/or expandable clips (shown in FIG. 8), are often used to retain bed cap member 140 to sidewall 108.

It should be appreciated that upon application of hook member 330 of latching system 300 to sidewall 108 during a latching operation of tonneau system 12, hook member 330 contacts and engages distal edge 146 of bed cap member 140, if such bed cap member is installed. Upon further application of latching force to retain tonneau system 12 in a locked position relative to cargo box 102 of pickup truck 100, a clamping pressure is exerted upon bed cap member 140 between distal edge 146 and an underside 15 of tonneau cover 12. This clamping force is thus primarily carried by inboard leg 142 of bed cap member 140. In some cases, this clamping force is sufficient to cause deformation of inboard leg 142 and/or bed cap member 140, cause damage to bed cap member 140, and/or cause tonneau system 12 to become loose relative to cargo box 102.

Bed Rail Extender Clip Member

In some embodiments according to the principles of the present teachings, as illustrated in FIGS. 8-12, a bed rail extender clip member 54 can be coupled to or otherwise mounted on inboard side 124 of sidewall 108. In some embodiments, as illustrated in FIGS. 10A-10C, extender clip member 54 can comprise a generally U-shaped member having a central body portion 56 and a pair of leg members 58, 60. A channel 62 is formed between the pair of leg members 58, 60. In some embodiments, extender clip member 54 is slid or otherwise positioned on the inboard side 124 of sidewall 108 such that each of the pair of leg members 58, 60 are positioned on opposing sides of inboard side 124 such that inboard edge 126 is received within channel 62 and abuts central body portion 56 (see FIGS. 8, 9, and 11). In some embodiments, the pair of leg members 58, 60 can be formed to produce a clamping force therebetween for, at least temporarily, holding extender clip member 54 in position upon inboard side 124 of sidewall 108.

A longitudinal thickness B (FIG. 10B) of central body portion 56 defines an offset or extension distance equal to thickness B. With particular reference to FIG. 8, it should be understood that extender clip member 54, when mounted on inboard side 124 of sidewall 108, extends the operable engaging distance of inboard side 124 of sidewall 108 to a distance longer (or lower in FIG. 8) than distal end 146 of inboard leg 142 of bed cap member 140. Specifically, as illustrated in FIG. 8, when extender clip member 54 is mounted to inboard side 124 of sidewall 108, the total distance and effective distal end of extender clip 54 becomes engagement surface 64 at a distance C from inboard edge 126 (generally equal to longitudinal thickness B (FIG. 10B) of extender clip member 54). Distance C is longer than distance A, the extending distance of inboard leg 142 of bed cap member 140, by a distance D.

In this way, latch feature or hook member 330 of latching assembly 300 contacts and engages engagement surface 64 of extender clip member 54 at a distance greater than the extended distance of inboard leg 142 of bed cap member 140. This arrangement ensures that main portion 332 of hook member 330 captures central body portion 56 of extender clip member 54 at engagement surface 64, thereby transferring all loading forces to sidewall 108 via extender clip member 54 without applying a compression force along inboard leg 142 of bed cap member 140.

With particular reference to FIGS. 11 and 12A-12C, it should be recognized that alternative cross-sectional shapes of extender clip member 54 are anticipated. The cross-sectional shape of extender clip member 54 can vary depending on the cross-sectional structure of the sidewall 108 and other vehicle parts and systems. In some embodiments, as illustrated in FIGS. 11 and 12A-12C, extender clip member 54 can comprise a generally flat central body portion 56 and associated engagement surface 64. In some embodiments, legs 58, 60 can be identically sized and arranged, or can define varying profiles, such as a generally straight leg 58' and a generally inwardly-directed, V-shaped leg 60' applying a clamping pressure therebetween for capturing inboard side 124 of sidewall 108. Similar to extender clip member 54, extender clip member 54' can define a longitudinal thickness B. It should be understood that extender clip member 54', when mounted on inboard side 124 of sidewall 108, extends the operable engaging distance of inboard side 124 of sidewall 108 to a distance longer (or lower in FIG. 11) than distal end 146 of inboard leg 142 of bed cap member 140. Specifically, as illustrated in FIG. 11, when extender clip member 54' is mounted to inboard side 124 of sidewall 108, the total distance and effective distal end of extender clip 54' becomes engagement surface 64 at a distance C from inboard edge 126 (generally equal to longitudinal thickness B (FIG. 12B) of extender clip member 54'). Distance C is longer than distance A, the extending distance of inboard leg 142 of bed bap member 140, by a distance D.

Tonneau Positioner

With reference to FIGS. 13-16, in some embodiments, tonneau system 12 can comprise a tonneau cover positioning system 400 for use with front rail member 20. It should be understood that tonneau cover positioning system 400 can also be used with any of the side members 22, 44, 34. However, in the interest of brevity, tonneau cover positioning system 400 will be discussed in connection with front rail member 20 and the front wall 106 of the cargo box of the pickup truck 100.

In some embodiments, front rail member 20 can comprise an integrally formed or fixedly coupled tonneau cover positioning system 400 that is joined to front rail member 20. In some embodiments, tonneau cover positioning system 400 can be joined with front rail member 20 for movement therewith in at least two directions (e.g. vehicle fore/aft direction, cross-vehicle direction, or a combination thereof). In some embodiments, tonneau cover positioning system 400 comprises a positioner mount 410 integrally formed or fixedly coupled to front rail member 20. It should be understood that positioner mount 410 can be joined or otherwise coupled to front rail member 20 in any one of a number of ways, including mechanical engagement 450 (see FIGS. 13-15), one or more fasteners 451 (see FIG. 15), adhesive 453 (see FIG. 14), or any other suitable connection system. It should thus be understood that the terms "joined" and/or "coupled" may be used interchangeably and shall include all known connection systems, unless otherwise noted.

In some embodiments, positioner mount 410 includes a profile that closely conforms to the corresponding wall of cargo box 102, such as the front wall 106 of the cargo box of the pickup truck 100. Specifically, in some embodiments, positioner mount 410 is shaped to define a generally C-shaped cross-section having a main body portion 412 sized and shaped to be received along top side 122 of the front wall 106 of the cargo box or along central body portion 144 of bed cap member 140. In some embodiments, main body portion 412 can comprise contours and/or undulations that closely follow similar features formed in the front wall 106 of the cargo box, bed cap member 140, or other sidewall to which positioning system 400 is to be mounted. Positioner mount 410 can include a pair of downwardly-extending leg members 414. A first of the pair of leg members 414 can extend from a central portion 416 of main body portion 412 to define a right angle 418 therebetween. A second of the pair of leg members 414 can extend from central portion 416 of main body portion to define an arcuate surface 420 therebetween. It should be appreciated that the specific cross-sectional profile of main body portion 412 can be tailored to closely conform to a specific vehicle configuration or can be tailored to universally fit a wide range of vehicle configurations.

Tonneau cover positioning system 400 can be made of a material that prevents corrosion and/or marring of the pickup truck or its related components, such as the bed cap, sidewalls, front wall 106, and the like. It should also be appreciated that tonneau cover positioning system 400 can include other features to prevent corrosion and/or marring, such as being treated with a non-scratch coating, including application of a seal or tape, and the like.

Figure 13:
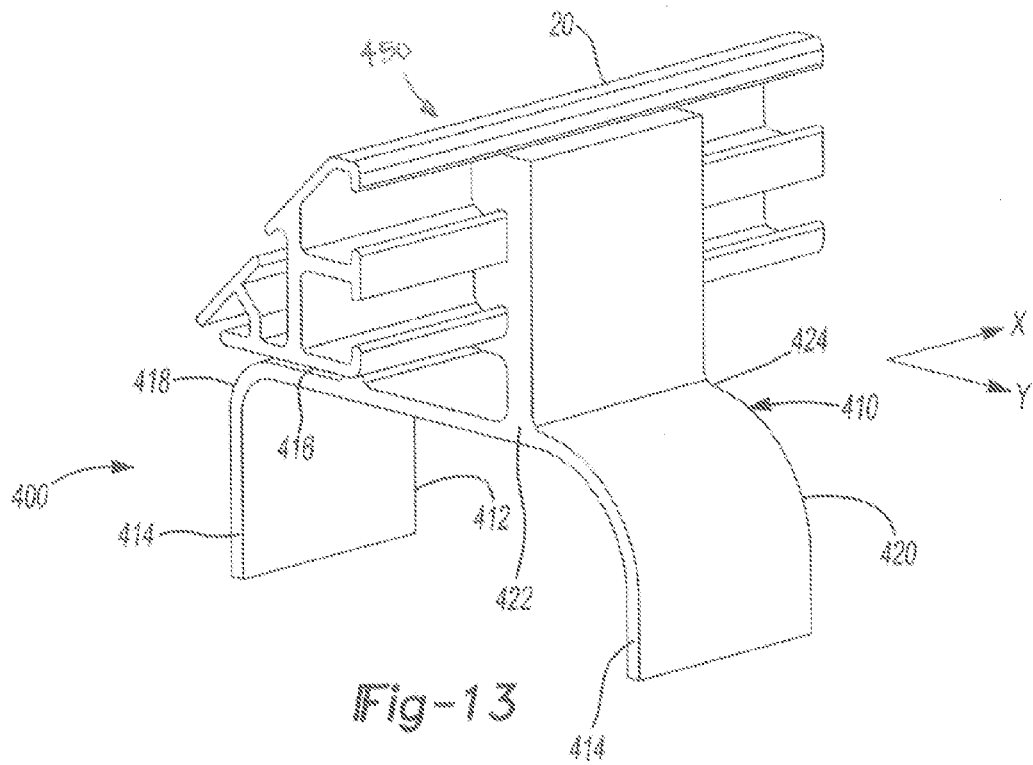
FIG. 13 is a perspective view of a tonneau cover positioning system to prevent or at least inhibit vehicle fore/aft movement according to some embodiments.
Figure 14:
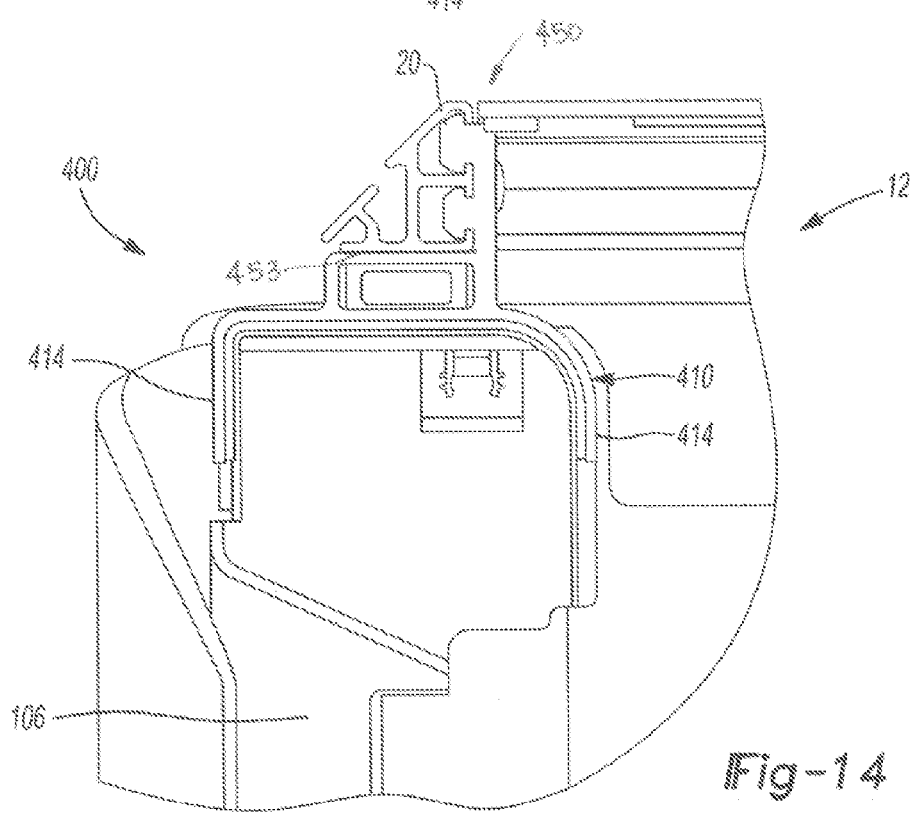
FIG. 14 is a partial cross sectional view of the tonneau cover positioning system mounted on a front wall of the cargo box of the pickup truck according to some embodiments.

With continued reference to FIGS. 13-15, it should be appreciated that the C-shaped cross-section of positioner mount 410, and particularly the pair of leg members 414, serve to capture the front wall 106, sidewall, or other pickup truck feature to prevent, or at least inhibit, translational movement of positioner mount 410 relative to the front wall 106, sidewall, or other feature in a direction generally indicated Y (FIG. 13). When positioner mount 410 is mounted to the front wall 106 of the cargo box of the pickup truck 100, this Y-direction is generally in the vehicle fore/aft direction. Therefore, when tonneau system 12 is mounted to front rail member 20, the combination of front rail member 20 and tonneau cover positioning system 400 prevents tonneau system 12 from moving in the vehicle fore-aft direction, thereby ensuring proper fore/aft positioning of the tonneau system 12 and reliable mounting thereof.

With particular reference to FIG. 16, it should be appreciated that in some embodiments two or more positioner mounts 410 can be integrally formed or fixedly coupled to front rail member 20. By positioning each of the two or more positioner mounts 410 at a location generally inboard from and adjacent to sidewalls 108, 110, movement of positioner mount 410 relative to the front wall 106, sidewalls 108, 110, or other feature in a direction generally indicated as X (FIGS. 13 and 16) can be prevented, or at least inhibited. That is, as illustrated in FIG. 16, in some embodiments a first positioner mount 410a can be positioned such that a first edge 422 (see FIG. 13) is closely positioned to sidewall 108. By way of non-limiting example, first positioner mount 410a can be positioned such that first edge 422 is within about 1/16 inch of sidewall 108. Similarly, in some embodiments a second positioner mount 410b can be positioned such that a second edge 424 opposite first edge 422 (see FIG. 13) is closely positioned to sidewall 110. By way of non-limiting example, second positioner mount 410b can be positioned such that second edge 424 is within about 1/16 inch of sidewall 110. When positioner mounts 410a and 410b are mounted to the front wall 106 of the cargo box of the pickup truck 100, this X-direction is generally in the cross vehicle direction. Therefore, when tonneau system 12 is mounted to front rail member 20, the combination of front rail member 20 and tonneau cover positioning system 400 (having two or more positioner mounts 410a, 410b) prevents tonneau system 12 from moving in the cross vehicle direction, thereby ensuring proper cross vehicle positioning of the tonneau system 12 and reliable mounting thereof. It should be appreciated that the present teachings permit installation of the tonneau system relative to the cargo box in a predetermined orientation and confirmation of proper orientation (by virtue of positioner mounts 410a, 410b being properly spaced from sidewalls 108, 110).

Unlike the prior art, the present teachings provide a tonneau cover system that provides an advantageous bed rail extender clip member for permitting mounting of a tonneau system to a cargo box having a bed cap or other feature. Moreover, unlike the prior art, the present teachings provide a tonneau cover system that provides possible retention and positioning of the tonneau cover in at least a vehicle fore/aft direction and optionally in a cross vehicle direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, the cargo box comprising a sidewall having an inboard side, said inboard side extending downward and comprising a lower edge, the cargo box further comprising a bed cap having an inboard leg extending downward below the lower edge of the inboard sidewall, the tonneau cover system comprising:
   a framework assembly positionable over the cargo box of the pickup truck;
   a clamp assembly operably coupled to the framework assembly, the clamp assembly having an engaging member selectively positioned between a latched position and an unlatched position; and
   a bed rail extender having an engagement surface and being designed to attach to the inboard side independent of the clamp assembly with the engagement surface spaced downward from the lower edge of the inboard side of the cargo box and below the inboard leg of the bed cap;
   wherein the engaging member of the clamp assembly is adapted to contact the engagement surface of the bed rail extender in the latched position to clamp the framework assembly to the cargo box without applying a compressive force to the inboard leg of the bed cap of the cargo box.

2. The tonneau cover system according to claim 1 wherein the bed rail extender is a clip comprising a main body portion and a pair of leg members extending from the main body portion to define a channel therebetween, the channel being sized to receive the inboard side of the cargo box of the pickup truck.

3. The tonneau cover system according to claim 2 wherein the pair of leg members exert a clamping force upon the inboard side of the cargo box of the pickup truck.

4. The tonneau cover system according to claim 2 wherein the pair of leg members are identically sized and arranged.

5. The tonneau cover system according to claim 2 wherein the pair of leg members each defines varying cross-sectional profiles relative to each other.

6. The tonneau cover system according to claim 2 wherein a first of the pair of leg members is generally straight and a second of the pair of leg members is generally V-shaped.

7. The tonneau cover system according to claim 1 wherein the pair of leg members each defines varying cross-sectional profiles relative to each other.

8. The tonneau cover system according to claim 1 wherein the clamp assembly is a locking spring clamp assembly.

9. The tonneau cover system according to claim 1 wherein the clamp assembly is a wing nut clamp assembly.

10. The tonneau cover system according to claim 1 wherein the clamp assembly is a cam actuated clamp assembly.

11. A tonneau cover system for a cargo box of a pickup truck, the cargo box having an inboard sidewall extending downward to a lower edge, the cargo box having a bed cap having an inboard leg extending downward beyond the lower edge of the inboard sidewall, the tonneau cover system comprising:
    a framework assembly positionable over the cargo box of the pickup truck;
    a clamp assembly operably coupled to the framework assembly, the clamp assembly having an engaging member selectively positioned between a latched position and an unlatched position; and
    a bed rail extender having an engagement surface, the bed rail extender being designed to attach to the inboard sidewall independent of the clamp assembly with the engagement surface spaced downward from the lower edge of the inboard sidewall and below the inboard leg of the bed cap;
    wherein the engaging member of the clamp assembly is adapted to contact the engagement surface of the bed rail extender in the latched position to clamp the framework assembly to the cargo box, and wherein the bed cap remains coupled to the sidewall of the cargo box allowing the clamp assembly to move away from the bed cap when the engaging member is in the unclamped position.

12. The tonneau cover system according to claim 11 wherein the bed rail extender is a clip comprising a main body portion and a pair of leg members extending from the main body portion to define a channel therebetween, the channel being sized to receive the inboard sidewall of the cargo box of the pickup truck.

13. The tonneau cover system according to claim 12 wherein the main body portion comprises the engagement surface.

14. The tonneau cover system according to claim 11 wherein the bed rail extender is clamped to the inboard sidewall of the cargo box of the pickup truck.

15. The tonneau cover system according to claim 12 wherein the pair of leg members are identically sized and arranged.

16. The tonneau cover system according to claim 12 wherein the pair of leg members each defines varying cross-sectional profiles relative to each other.

17. The tonneau cover system according to claim 12 wherein a first of the pair of leg members is generally straight and a second of the pair of leg members is generally V-shaped.

18. The tonneau cover system according to claim 11 wherein the pair of leg members each defines varying cross-sectional profiles relative to each other.

* * * * *